United States Patent [19]

Williams

[11] Patent Number: 5,401,560
[45] Date of Patent: Mar. 28, 1995

[54] POLYMER BACKED MATERIAL WITH NON-SLIP SURFACE USING E-BEAM CURED URETHANE BINDER

[75] Inventor: David E. Williams, East Amherst, N.Y.

[73] Assignee: Norton Company, Worcester, Mass.

[21] Appl. No.: 61,956

[22] Filed: May 17, 1993

Related U.S. Application Data

[63] Continuation of Ser. No. 769,709, Oct. 2, 1991, abandoned, which is a continuation-in-part of Ser. No. 638,638, Jan. 8, 1991, abandoned.

[51] Int. Cl.[6] .............................................. B32B 5/16
[52] U.S. Cl. ................................. 428/143; 428/149; 428/148; 428/424.4; 428/424.6; 428/156; 428/424.7; 428/424.8; 428/425.9; 428/423.3; 428/423.7; 428/424.2; 428/341; 428/329; 428/331; 428/219; 428/908.8; 51/297; 51/298; 51/295

[58] Field of Search ............ 428/143, 149, 148, 424.4, 428/424.6, 156, 424.7, 424.8, 425.9, 423.3, 423.7, 424.2, 341, 329, 331, 219, 908.8; 51/297, 298, 295

[56] References Cited

U.S. PATENT DOCUMENTS

| | | | |
|---|---|---|---|
| 4,196,243 | 4/1980 | Sachs | 428/147 |
| 4,336,293 | 6/1982 | Eiden | 428/143 |
| 4,345,545 | 8/1982 | Miller | 118/621 |
| 4,385,239 | 5/1983 | Miller | 250/492.3 |
| 4,457,766 | 7/1984 | Caul | 51/298 |
| 4,547,204 | 10/1984 | Caul | 51/298 |
| 4,588,419 | 5/1986 | Caul | 51/295 |
| 4,606,154 | 8/1986 | Herrmann et al. | 51/401 |
| 4,608,287 | 8/1986 | Biotteau | 428/40 |
| 4,642,126 | 2/1987 | Zador et al. | 51/295 |
| 4,652,274 | 3/1987 | Boettcher et al. | 51/298 |
| 4,828,583 | 5/1989 | Oxman et al. | 51/295 |

*Primary Examiner*—William P. Watkins, III
*Attorney, Agent, or Firm*—David Bennett

[57] ABSTRACT

Non-slip laminatable materials are provided by coating a polymer sheet backing with mineral particles adhered to the backing by a radiation curable adhesive.

8 Claims, No Drawings

POLYMER BACKED MATERIAL WITH NON-SLIP SURFACE USING E-BEAM CURED URETHANE BINDER

This is a continuation of application Ser. No. 07/769,709, filed Oct. 2, 1991, (now abandoned), which was itself a continuation-in-part of application Ser. No. 07/638,638, filed Jan. 8, 1991, (now abandoned).

FIELD OF THE INVENTION

The present invention generally relates to materials with non-slip surfaces and methods of forming such products. More particularly, the invention relates to polymer, e.g. polyvinyl chloride, backed products with non-slip surfaces and methods of making such products.

BACKGROUND OF THE INVENTION

It is well known in the coated abrasive art to apply a resinous binder and abrasive grains to a paper or cloth backing material (the "backer") and then to cure the binder to produce a coated abrasive product. Typically, one or more overcoats (the "size" coats) are applied over the grain carrying layer (the "make" coat) and, in turn, cured. The use of radiation curing technology, e.g., electron beam technology, to fix abrasive grit to certain substrates such as paper and cloth is known in the art. Systems for commercially applying such radiation curing, e.g., electron beam curing technology, to the manufacture of coated abrasives are disclosed and explained in U.S. Pat. Nos. 4,345,545 and 4,385,239. Electron beam curable resin systems applicable to the electron beam manufacture of coated abrasive products are also well known as disclosed and explained in U.S. Pat. Nos. 4,457,766; 4,547,204; and 4,588,419. These patents teach the use of urethane oligomers as radiation curable resin systems, e.g., electron beam curable resins, in the fixing of abrasive grits to substrates such as webs (backers) of paper and cloth.

The application of mineral particles to a polyvinyl chloride floor matting material is discussed in U.S. Pat. No. 4,336,293. In this reference, a polyamide primer is applied to a silicone impregnated kraft release paper. Then a heat curable liquid polyurethane make resin is coated onto the polyamide primer. This composition is then partially thermally cured by running it through an oven at 120° C. for 30 minutes. Once it is partially heat cured, the mineral particles are applied and a size coating, e.g., the same composition as the make coat, is spread on and the composite again run through an oven at 130° C. for 4 hours to fully thermally cure it. In the formation of the composite, the polyamide "prime coating" is a "hot melt adhesive resin." The composite, still on the kraft release paper which is necessary to preserve the form of this intermediate product which would otherwise be subject to severe thermal distortions, is then concurrently fed, in sheet form, into an extruder along with hot, melted polyvinyl chloride (in liquid form) which adheres or bonds to the polyamide "prime coating" to glue the polyamide, as a hot melt adhesive, to the solidifying surface of the polyvinyl chloride which forms the backer. The kraft release paper is peeled off as the composite is laminated to polyvinyl chloride substrate material, the combination which then forms the floor matting. The composite may be embossed, on the side opposed to that receiving the backer layer, at the same time it is coated with the backer. The invention described is severely restricted in its choice of backer in that distortions in use as a result of temperature cycling and stretching forces restrict the materials that can be used. Additionally the use of the kraft paper layer which is subsequently discarded involves necessary complications, without which however the process would not work.

U.S. Pat. 4,196,243 teaches the formation of a "plastic wear layer" on a polyvinyl chloride substrate having a thickness in the range of about 50–250 mils. Ultraviolet light is used to cure the polyurethane make and size coatings which are used. The make and size resin systems must be modified by the addition of "photosensitizers" which are sensitive to the wave length and energy level of the ultraviolet light source that is being applied.

U.S. Pat. 4,608,287 shows the formation of an "abrasive" coating on a "plastified" polyvinyl chloride film of 0.05 mm in thickness. The polyvinyl chloride film, itself, has a paper sheet adhered to its opposite surface by a pressure sensitive adhesive. A chalk extended polyoxpropylene glycol/diphenylmethane diisocyanate (polyurethane) resin system is applied to what is to be the "abrasive" coated side of the polyvinyl chloride backer. Granulated polyurethane, as the "abrasive" material, is then spread on top of the resin system, and the composite is put into a hot air drying oven at 80° C. for 5 minutes "to accelerate cross-linking." A second example in this reference shows the use of a non-woven fabric layer backer bonded with an acrylic resin. On this fabric layer backer, a coating of heat curable "synthetic rubber based adhesive" is formed. Then, on this synthetic rubber layer, a diphenylmethane diisocyanate (70% aliphatic solvents) layer is formed, onto which is spread granulated polyurethane powder. This formed composite then is put into an oven at 80° C. for 7 minutes to "cross-link" the resin by "evaporation of the solvents." Following this, a second coat of the polyurethane resin (this time with 30% aliphatic solvents) is spread on, and the composite is placed back into the oven at 80° C. for another 7 minutes. This second resin layer is said to provide "an anti-dirt protective film" and to "increase the abrasive strength." In this second example, no polyvinyl chloride is used.

Polyvinyl chloride has a relatively low softening point, thus rendering it unsuitable, as a backer material, for use in conventional thermal curing techniques for producing coated abrasive products. The radiation curing techniques, as explained in several of the above cited references, do not use the application of heat, per se, as the primary means for curing resins. Thus, the heat generated in the electron beam resin curing processes, although existent, does not reach the levels wherein polyvinyl chloride materials, especially in relatively unsupported thin sheet form, are rendered overly softened, melted or decomposed. The electron beam resin curing techniques are especially suitable for application to production of the products of the present invention. In particular, U.S. Pat. Nos. 4,345,545; 4,385,239; 4,457,766; 4,547,204; and 4,588,419 are specifically included herein by this reference in respect to their respective pertinent description and discussions of the relevant factors applicable to the electron beam formation of coated abrasives and variants thereof.

These, and other features of the present invention can be more readily comprehended from a reading of the cited references, and the following text of the specification, as well as from the claims hereinafter appended.

BRIEF DESCRIPTION OF THE INVENTION

The products of the present invention comprise a polymer backing material and, adhered to the surface of the backing by a radiation-curable adhesive, mineral particles so as to provide a non-slip surface.

The products of the present invention will, in many cases (but not, necessarily, always), be laminated or bonded to other substrates of natural and synthetic materials, e.g., wood, concrete, metal, polyurethanes, polyethylenes, polyesters, polyvinyl chloride, polyisoprenes, synthetic and natural rubbers and the like. Some of these other substrates may have relatively complex surface configurations, e.g., extruded, polyvinyl chloride floor matting materials. Thus, the products of the present invention must, in many cases, be severely deformed or "shaped" to permit substantially the full surface areas thereof to come into surface-to-surface contact with those complex surface configurations to permit effective lamination or bonding at substantially at all points of contact.

It is also highly preferred that the materials selected should be thermoformable as a unit without decomposition of any of the components or delamination by failure of the bond between the backer material and the resin bonding the mineral particles to the backer material. To ensure the capability of deformation or "shaping", it is also important for the products of the present invention to be able to flex to a significant degree. For other applications, the products of the present invention may be used directly; i.e., without being bonded to a substrate; in such applications the backer, per se, also usually functions as the substrate.

In practice, therefore, to permit such flexing and/or thermoforming, its preferred that several of the physical properties of the resin system(s), used to bond the mineral particles of the present invention to the backer be as closely matched as possible to the backer which is used. Examples of such physical properties, which are deemed important to be substantially matched, include flexibility, stretchability, yield, tensile, elongation, deformation, rate of softening, melt point, etc. Thus, it is considered a key feature of the present invention that the resin systems, described hereinafter, when applied as hereinafter described, and when radiation cured, preferably electron beam cured, have such physical properties, particularly in regard to flexibility, that when bonded to the backer which is used, e.g., the preferred polyvinyl chloride backer sheet or film materials preferably in the range of 6 mils or less in thickness, the tensile strength of the product of the present invention is equivalent to or greater than that of the backer which is used, and the elongation potential of such product of the present invention is not less than 25% of that original backer material but with that product of the present invention still capable of being stretched (elongated) in any given direction, without tearing, to a dimension which is at least 110% and preferably 125% of the corresponding unstretched (unelongated) dimension; this ensures sufficient flexibility for the deformation and "shaping" as discussed above. The present invention is not, however, limited to application to backer materials which are 6 mils or less in thickness.

The resin system(s) of the present invention, in addition, has (have) relatively unique physical properties not apparent in many backer materials, e.g., the preferred polyvinyl chloride, e.g., such physical properties as the capability of readily bonding to the mineral particles of the present invention, the capability of holding those particles securely in place while physical forces are applied thereto in use and the capability of complimenting the flexibility properties of those backer materials. Finally, the resin system(s) of the present invention is (are) designed to be substantially at least as resistant to chemical attack (corrosion) as the selected backer material, e.g., polyvinyl chloride backer, and to exhibit substantially at least an equivalent degree of durability in comparison to the selected backer material, e.g., polyvinyl chloride backer material. It is, of course, highly desirable that it is thermoformable under conditions in which the backer material can be thermoformed.

Mineral particles, e.g., aluminum oxide and silicon carbide, fumed silica and silica gel, preferably in the form of standard grain size particles, preferably within the range of about 50 grit to about 220 grit, in size, are bonded to the preferred polyvinyl chloride backer material by way of one or more radiation curable, preferably electron beam curable, urethane oligomer resin systems. Preferably, two or more different grades of polyester urethane acrylate resins are blended and mixed together with a combination of ethoxyethoxyethyl acrylate and N-vinyl-2-pyrrolidone monomer diluent materials, in a ratio which renders the resin system radiation curable, preferably electron beam curable, and which, upon curing, produces a resinous film, bonded to a backer material selected from the group consisting of polyurethane, polyester, polystyrene, polypropylene and other synthetic or natural polymer materials, preferably a polyvinyl chloride backer, which compliment several of the physical properties of that substrate.

The resin system is initially applied as a make coat to the selected backer, preferably a polyvinyl chloride backer, by conventional means. Following this, the particles are distributed onto the make coat, usually in a uniform density and thickness, also by conventional means. Alternatively, the mineral particles may be blended into the resin system being used, to form a slurry; the slurry containing the mineral particles is then applied as such to the selected backer. Then preferably the make coat system (or the resin system which is part of the slurry, as the case may be) is electron beam cured, although this step is optional as the preferred electron beam curing techniques, or other radiation curing techniques, may alternatively be accomplished in a single step, after the size coat, explained hereinafter, has been applied.

Following the application of the make coat, and, if desired, the preferred electron beam (or other radiation) curing thereof, a size coat, either of the same resin system as used for the maker coat, or of another resin system with like or complimentary properties in relation to the maker coat, is applied over the distributed abrasive grit particles, likewise, by conventional means. Then the one or more resin systems of the present invention are radiation cured, preferably electron beam cured in the manner described in those cited references which are, e.g., specifically included herein by reference. Thus, both the one or more resins systems, with the mineral particles imbedded therein and bonded thereon and/or thereto, are bonded, in turn, to the selected backer, preferably a polyvinyl chloride backer, to form a product of the present invention.

A preferred resin system, within the scope of the present invention, which is electron beam curable, is formed by mixing N-vinyl-2-pyrrolidone monomer, in a stabilized form, preferably with an equal portion, by weight, of ethoxyethoxyethyl acrylate, at a temperature in the range of room temperature to about 110° F., preferably 90° F. to 100° F., more preferably 95° F. Then at least two differing grades of polyester urethane acrylate resin are prepared for blending into the foregoing mixture by melting them to the point of ready flowability, preferably at 155° F. to 165° F., more preferably 160° F., for a period of time sufficient to produce such flowability, preferably for a period of 22 to 26 hours, more preferably 24 hours.

In sequence, the first of such preferred polyester urethane acrylate resin grades, followed by the second of such preferred grades, are preferably blended in the mixture of stabilized N-vinyl-2-pyrrolidone and ethoxyethoxyethyl acrylate, with such mixture being maintained preferably at temperature within the range of 90° F. to 100° F. and with the preferred total final mixture of ingredients including 14 to 15 weight percent of stabilized N-vinyl-2-pyrrolidone, 14 to 15 weight percent of ethoxyethoxyethyl acrylate, 34.5 to 35.5 weight percent of the first of such polyester urethane acrylate resin grades and 34.5 to 35.5 weight percent of the second of such resin grades. Optionally, preferably up to 0.06 weight percent of fluorocarbon surfactant, for example, FC-171, a product of the Minnesota Mining and Manufacturing Company of St. Paul, Minn., U.S.A., may be added as a wetting agent, more preferably 0.04 weight percent. It is notable that preferably no fillers, pigments (or other coloring agents) or suspending agents are used in the resin systems of the present invention, although one or more fillers, pigments, other coloring agents and/or suspending agents may be used if desired; however, such must be carefully selected so as not to impede, or otherwise interfere with, the radiation curing technique which is to be applied (such additions do not create significant problem if the preferred electron beam curing is used). The mixture is mixed, preferably agitated, preferably at a slow speed, preferably accompanied by short, intermittent bursts of medium to high speed mixing, preferably agitation, until thoroughly mixed and uniformly blended, and until the temperature of the mixture is stabilized within the range of 60° F. to 120° F: preferably within the range of 90° F. to 100° F., throughout. Thus, a radiation curable resin system, e.g., an electron beam curable resin system, is produced within the scope of the present invention.

The preferred polyvinyl chloride backed coated non-slip product of the present invention may be bonded to, for example, a polyvinyl chloride substrate, e.g., sheet or film material, by co-extrusion, whereby the product of the present invention is linearly extruded, preferably through a conventional extrusion die, along with a selected substrate material, preferably polyvinyl chloride, by conventional extrusion methods and using conventional extrusion equipment, to produce, for example, a floor mat with the product of the present invention bonded to the surface thereof. The product of the present invention is, preferably, laminated and bonded to a selected substrate, e.g., a polyvinyl chloride solid article, which may or may not be heat pre-softened, by the application of heat and pressure, by methods which are well known to those with skill in the art; alternatively the surface of the polyvinyl chloride or other substrate material may be rendered molten by the application of heat and/or pressure. Further, adhesive materials, as are conventionally used to bond together polymer materials, e.g., to bond polyvinyl chloride together, or to bond polyvinyl chloride or other polymers to dissimilar polymers or to other materials, may likewise be utilized where such backers and/or substrates are used.

Although the most preferred backer material of the present invention is polyvinyl chloride, the backer material may be selected from the group consisting of polyvinyl chloride polyethylene, polyurethane, polyethylene terephthalate (polyester), polypropylene, polyamide, polysulfide, polystyrene, polyvinyl acetate, polybutadiene, acrylonitrile-butadiene, acrylonitrile-butadiene-styrene copolymer, styrene-butadiene, acrylonitrile-styrene copolymer and vinylidene chloride, with the more preferred backer materials being polyurethane, polyethylene, polyester, polyamide, polypropylene and polysulfide.

These and other features of the present invention may be better understood from a reading of the following specification text and the appended claims.

DETAILED DESCRIPTION OF THE INVENTION

The polymer backed non-slip products, of the present invention, may be prepared by girt coating preferably a polyvinyl chloride backer material with an inorganic mineral particles. The preferred polyvinyl chloride material may be any commercially available polyvinyl chloride, but preferably is sheeting or film, and should be preferably of a thickness which will enable sufficient structural integrity for handling, but which is also sufficiently flexible and pliable to be continuously fed through radiation curing equipment, e.g., electron beam curing equipment, adapted to produce non-slip sheet products. The preferred polyvinyl chloride backing material, preferably sheet or film, is preferably about 10 mils or less in thickness, more preferably about 6 mils or less in thickness, although the present invention is not limited to applications wherein the polyvinyl chloride backing, or other backing material, is 10 mils or less in thickness.

A variety of mineral particles may be employed which will provide adequate frictional contact in use to prevent, or aid in the prevention of, slippage or skidding. Examples of suitable mineral particles are aluminum oxide and silicon carbide fumed silica and silica gel; other mineral materials which are adaptable to radiation curing, in particular electron beam curing, may also be utilized.

A maker and size coating comprising at least one resin system which is radiation curable, preferably electron beam curable, and provides a durable size coating for the intended use of the product is utilized. A maker coat is the resin coat onto which the particles are deposited. A size coat is the coat which is placed over the particles to aid in holding them onto the substrate during flexing and wear applications, usually in combination with some form of pressure or other applied physical force. A second size coat, sometimes referred to as an "over" or "super size" coat, may also be applied, if desired, although in many cases this is not necessary. The amount of the maker and size coats applied are whatever is sufficient to adequately hold and secure the to the polyvinyl chloride substrate, of the present invention, in subsequent use, i.e., as a stand-alone product or by bonding and/or lamination to some other substrate, and in final application, e.g., a floor or a floor mat surface, a hand tool grip or other non-slip applications, as are well known to those skilled in the art. The methods of applying the coatings of the present invention may be selected from those which are conventionally used with the electron beam curing methods of forming coated abrasive products. Among typical methods, for examples, are knife coating, roll pressure coating, transfer roll coating and doctor blade coating. The preferred method of coating used for the present invention is pressure roll coating.

The resin system is chosen to match, in its preferred electron beam cured form, certain physical properties of the preferred polyvinyl chloride backer. The properties of the systems which are deemed to be significant are those described above, i.e., such as flexibility, stretchability, yield, tensile, elongation, deformability, rate of softening, melt point, corrosion resistance, durability, capability of securely bonding to both the mineral particles and the preferred polyvinyl chloride backer of the present invention and, of course, the capability of being readily radiation cured, preferably electron beam cured, as applied to a preferred polyvinyl chloride backer. It is quite important to ensure that the physical properties of the preferred electron beam cured resin system(s), bonded to both the preferred polyvinyl chloride backer and to the mineral particles, is (are) capable of being deformed and bonded and/or laminated, in unison with the preferred polyvinyl chloride backer of the present invention, to substrates, either of polyvinyl chloride material or otherwise. To ensure this, it is important that the flexibility of the resin system(s) is (are) generally complimentary to that of the backer material being used. A resin system (or systems) which is (or are) deemed complimentary, within the scope of the present invention, is one (or more) which produces a linear tensile strength, in the product of the present invention, which is at least as great as that of the backer used, and which reduces (or reduce) the elongation potential of the product of the present invention to no less than 25% of that of the backer material, as such, which is being used, but in no case produces an elongation capability of less than 125% of the original dimension of that product, in any given direction, on stretching, before tearing. In particular, in the preferred embodiment of the present invention, it is important that the resin system(s), in its (their) preferred electron beam cured form, is (are) capable of a bonding strength, in respect to both the preferred polyvinyl chloride backer and the mineral particles of the present invention, which is at least as great as the bonding and/of lamination strength between the preferred polyvinyl chloride backer of the present invention and the substrates to which that polyvinyl chloride substrate is to be bonded, as the case may be.

The preferred resin system or systems to be used is (are) a unique combination of resin components, made from commercially available resins, with diluents and other components, which re notable for their ability to be blended together. More specifically, the resin system(s) preferably comprise a blend of two or more grades of urethane oligomers, both of which are polyester urethane acrylates, and these are further blended with a combination of ethoxyethoxyethyl acrylate and stabilized N-vinyl-2-pyrrolidone monomers, this latter combination being radiation curable and comprising a diluent. In addition, one or more surfactants, preferably containing fluorocarbon material, may be added as wetting agents.

Diluents are added to adjust the viscosity of the coating mixture, adjusting that viscosity, and the sag resistance of the resin system(s), to best suit the application method thereof, such as, e.g., knife coating, roll pressure coating, transfer roll coating or doctor blade coating, techniques which are well known to those skilled in the art of making coated abrasive products. Further, the diluents may be used to modify the radiation curing properties of the resin system(s) and the flexibility of both the radiation, e.g., electron beam, cured resin system(s) and of the products of the present invention. Among suitable diluents for the electron beam curable resins are the vinyl pyrrolidones and the multifunctional and mono-functional acrylates, including, but not limited to, N-vinyl-2-pyrrolidone; 1,6 hexanediol diacrylate; tetraethylene glycol diacrylate; and trimethylolpropane triacrylate. The preferred diluent material is N-vinyl-2-pyrrolidone monomer, in a stabilized form. These materials, in addition to adjusting viscosity, tend to modify flexibility and reduce the energy level of the preferred electron beam radiation energy required for curing.

The preferred product of the present invention, in the form of an electron beam cured coated abrasive with mineral particles on a polyvinyl chloride backer, may be readily co-extruded with a polyvinyl chloride compound, as normally used to form floor mating material, as that compound is being formed into floor matting; the standard floor mating then acts as a substrate, having the same composition as the grit coated polyvinyl chloride backer. Alternatively, the application of sufficient heat and pressure can be utilized to laminate the two together. Once in a formed state the mineral particles should remain thoroughly secured in and to the stretched film. Furthermore, the product is tough and flexible enough to offer good slip-resistance, skid-resistance and durability, in the form of wear-resistance, to heavy pedestrian traffic normally encountered in restaurants, kitchens, service stations, checkout counters and the like.

The following example illustrates the preferred embodiment and best presently known mode of the present invention and is in no way intended to be limiting. It is understood that many other embodiments may be readily devised, by those skilled in the art, without departing from the spirit and scope of the present invention.

EXAMPLE

Two different grades of polyester urethane acrylate resin were used in forming the preferred resin system of the present invention, the first being Uvithane ® UV-782 nd the second being Uvithane ® UV-783, both as supplied by Morton Thiokol, Inc., Morton Chemical Division of Moss Point, Miss., U.S.A. The UV-782 resin grade, having CAS Number 64060-30-6. The UV-783 resin grade, having CAS Number 64060-31-7. Both of these resin grades, in their respective shipping containers, were placed into and oven at 160° F. and held at that temperature for 24 hours to preheat them.

Concurrent with the latter period of the preheating of the two grades of polyester urethane acrylate resin, a mixing and blending kettle was preheated with hot water to 90° F., in a manner, and using equipment, common to the coated abrasive manufacturing industry. Initially added to the kettle, at 90° F., was 192 lbs. of stabilized N-vinyl-2-pyrrolidone monomer, specifically V-Pyrol ®/RC as supplied by GAF Corporation of New York, N.Y., U.S.A., having CAS number 88-12-0, and containing at least 98.5 weight percent of $C_6H_{16}O_4$.

While holding the stabilized N-vinyl-2-pyrrolidone monomer in the kettle at 90° F., 192 lbs. of ethoxyethoxyethyl acrylate was added, mixed, and blended into that N-vinyl-2-pyrrolidone monomer. Specifically RC-20 ethoxyethoxyethyl acrylate was used, being supplied by the same source as the UV 782 and UV 783. The RC-20 bears CAS Number 7328-17-8 and with essentially the formula $C_6H_{16}O_4$. Care was taken in adding the RC-20 material to the V-Pyrol®/Rc in the kettle to ensure that the mix temperature did not drift below 85° F.

After the RC-20 and the V-Pyrol®/RC were thoroughly mixed and blended together, and the temperature was stabilized at 90° F., 450 lbs. of UV-782, at a temperature of 160° F., were added, being mixed in and blended in such a manner that the kettle contents temperature did not exceed 95° F. Then, likewise, 450 lbs. of UV-783, also at a temperature of 160° F., were added, being mixed in and blended in such a manner that the kettle contents temperature did not exceed 95° F. Finally, 3 lbs. of fluorocarbon surfactant, namely FC-171, were added in, mixed and blended, and the temperature of the batch in the kettle was stabilized at 90° F.

The mixing and blending were accomplished using a variation of mixer speeds, as is quite common in the art, and the batch mixture was circulated into and out of the kettle to further assure fully mixed and blended uniformity and a stabilized uniform batch temperature, also as is quite common in the art. Thus, the preferred resin system was formulated and prepared.

In the Example described herein, the preferred resin system was applied to the dull side of 6 mil thickness polyvinyl chloride film, 40 inches wide, weighing the equivalent of 13.7 lbs./ream, and processed through the electron beam curing equipment, in accord with the equipment and procedures specified in the above published references which have been specifically incorporated herein by reference, using a radiation energy range of 1 to 10 MRAD, preferably 3 MRAD (used for the present Example), within a range of 250 to 325 KV, preferably at 285 KV (used for the present Example), in an inerting atmosphere of nitrogen, having an oxygen content of less than 2000 PPM. The polyvinyl chloride film used in the present Example was Product No. 39-44-0001-00-4, Vinyl Film, as supplied by RJF International Corporation (formerly The B. F. Goodrich Company, Engineered Products Group), Akron, Ohio, U.S.A.

The application of the resin, in the Example, to the 6 mil thickness polyvinyl chloride film was accomplished by use of a standard transfer roll coating system for both the make and the size coats; the make coat and size coat were both identical, being of the preferred resin system as described above.

The weight of the electron beam cured end product of the Example was the equivalent of 43.5 lbs./ream, ±4.0 lbs./ream. The mineral particles used were standard aluminum oxide grits, having a standard grit size of 100. The applied grit may be within the weight range of about 10 to 25 lbs./ream, and in the present Example, comprised the overall preferred equivalent weight of 20.0 lbs./ream, ±2.0 lbs./ream, while the overall weight of electron beam cured resin in the final product may be within the range of about 4 to 5 lbs./ream, and in the present Example comprised the preferred equivalent of 10.5 lbs./ream, ±1.0 lbs./ream. The amount applied is described above in terms of "lbs/ream" and this term is understood to refer to the pounds applied per ream of surface area. The "ream" used in the content of coated abrasives is understood to be a "sandpaper-markers reams". It corresponds to the surface area of 480 9×11 inch sheets.

The finished non-slip sheet product was bonded to an otherwise standard ribbed polyvinyl chloride floor mat material, as produced by RJF International Corporation of Akron, Ohio, U.S.A. under the Keroseal® trademark, by co-extrusion during the otherwise normal production of that floor mat material. The bonded floor mat material exhibited excellent bonding between the coated abrasive product of the present invention and the floor mat material, without use of any separate bonding agents or adhesives.

The finished product of the instant Example was tested for tensile strength and elongation by an Instron® tensile tester, using a sample size of 1"×8" with a 6" gauge length, a cross-head speed of 1" per minute and a chart speed of ½" per minute (full chart scale=20 lbs.). The results of those substantially all of the abrasive particles remained firmly bonded to the test pieces after being subjected to the foregoing tensile and elongation tests.

As a general proposition for the products of the present invention, the tensile strength, in lbs./linear inch, should be at least as great as that exhibited by the particular backer material used, as measured in its uncoated state. Also, as a general proposition for the non-slip product of the present invention, the elongation, in inches, should not be less than 25% of that which is exhibited by the particular backer material used, as measured in its uncoated state, however, at the same time, the product of the present invention should be capable of being linearly stretched (elongated), in any given direction, to a dimension which is at least 110% of the original unstretched (unelongated) dimension, in that same direction, before tearing occurs. Observation has indicated that the limitations of the foregoing general propositions are necessary to ensure the desired physical properties, in particular, flexibility, as discussed above, of the non-slip sheet product of the present invention. Because the sheet material of the invention is thermoformable, the thermal softening and decomposition temperatures of the backing and the radiation curable urethane polymer used to bond the abrasive particles to the backing should be such as to permit thermoforming of the finished sheet product and lamination to a desired substrate.

The preferred embodiment of the product of the present invention has been carefully examined in comparison to the virgin 6 mil thick polyvinyl chloride sheet on which it is preferably formed, and both were noted to exhibit the desired physical properties as set forth and discussed above. In use, the preferred embodiment of the coated abrasive product of the present invention, as bonded to a standard ribbed polyvinyl chloride floor mat material, appears to exhibit good wear characteristics as well as providing relatively outstanding resistance to slipping and skidding.

While the invention has been described with specific embodiments, there are modifications that may be made without departing from the spirit of the invention. The scope of the invention is not to be limited by specific illustrations or by the preferred embodiment and best mode, but is defined by the claims.

What is claimed is:

1. A non-slip article comprising a polymeric backing of material selected from the group consisting of polyvinyl chloride, polyethylene, polyurethane, polyester, polypropylene, polyamide, polysulfide, polystyrene, polyvinyl acetate, polybutadiene, styrene-butadiene, acrylonitrile-butadiene, acrylonitrile-styrene copolymer, acrylonitrile-butadiene-styrene copolymer and vinylidene chloride, said polymeric backing having from about 10 to 25 lbs./ream of a mineral particulate material bonded thereto by from about 4 to about 15 lbs./ream of radiation cured polyurethane binder material, said polyurethane binder material comprising a blended mixture of at least one grade of polyester urethane acrylate resin and a combination of ethoxyethoxyethyl acrylate and N-vinyl-2-pyrrolidone monomer, and wherein the linear tensile strength of the non-slip article is at least as great as the linear tensile strength of said polymeric backing, and wherein the elongation capability (before tearing occurs), of said non-slip article, is at least 25%, of that of said polymeric backing, and said elongation capability (before tearing occurs) of said non-slip article is also at least 125%, in any given direction, of the unelongated dimension in that same direction; the backer material and the resin bonding material being selected such that the non-slip is thermoformable without delamiantion or decomposition of the components.

2. The article of claim 1 wherein said elongation capability (before tearing occurs) is at least 30% of that of said polymeric backing, and said elongation capability (before tearing occurs) is at least 140% in any given direction, of the unelongated dimension in that same direction.

3. The article of claim 1 wherein said elongation capability (before tearing occurs) is at least 40% of that of said polymeric backing, and said elongation capability (before tearing occurs) is at least 150%, in any given direction of the unelongated dimension in that same direction.

4. The article of claim 1 which comprises from about 15 to about 25 lbs./ream of said mineral particulate material.

5. The article of claim 1 which comprises from about 8 to about 12 lbs./ream of radiation cured polyurethane binder material.

6. The article of claim 1 wherein said radiation cured polyurethane binder material is electron beam cured binder material.

7. The article of claim 1 wherein said polymeric backing of material is selected from the group consisting of polyvinyl chloride, polyurethane, polyethylene, polyester, polyamide, polypropylene and polysulfide.

8. The article of claim 1 wherein said polymeric backing of material is polyvinyl chloride.

* * * * *